United States Patent [19]

Smith

[11] Patent Number: 4,540,846

[45] Date of Patent: Sep. 10, 1985

[54] CABLE TERMINAL PEDESTAL

[75] Inventor: Arnold R. Smith, Chester, N.J.

[73] Assignee: AT&T Bell Laboratories, Murray Hill, N.J.

[21] Appl. No.: 454,160

[22] Filed: Dec. 29, 1982

[51] Int. Cl.³ .......................... H02G 9/02; H02G 15/06
[52] U.S. Cl. ..................................................... 174/38
[58] Field of Search ........................ 174/37, 38, 50, 60

[56] References Cited

U.S. PATENT DOCUMENTS

| | | | |
|---|---|---|---|
| 3,404,212 | 10/1968 | Mack et al. | 174/38 |
| 3,864,510 | 2/1975 | Ramsey, Jr. et al. | 174/38 |
| 3,892,910 | 7/1975 | Smith | 174/37 |
| 3,991,264 | 11/1976 | Connell | 174/38 |
| 4,058,670 | 11/1977 | Leschinger | 174/38 |

FOREIGN PATENT DOCUMENTS 482331  1/1970  Switzerland ........................ 174/38

*Primary Examiner*—Laramie E. Askin

[57] ABSTRACT

A pedestal closure for underground cable connections includes a rear member (10), splice support ladder (20), backboard assembly (30), and upper (40 and 80) and lower front members (50) all of which are composed principally of plastic material. The rear member (10) has several features molded into its structure to facilitate attachment of the before-described members thereto. In addition, an electrically conductive bond bar assembly (60) is attached to the rear member (10).

The upper front member (40 and 80) is one of two types. One type is a standard upper front member (40) which has a tamper resistant latching member (402) which restricts unauthorized entry into the pedestal closure (3). The other type is a flood cover member (80), which is utilized in high water areas. The flood cover member (80) which is a polygonal-shaped member and is interchangeable with the standard member (40), fits over siderails (102) of the rear member (10). The flood cover member (80) has two latching members (805), one which is tamper resistant like that of the standard member (40), the other latching member (805) has a handle (811) attached thereto. Service personnel can actuate both members (805) simultaneously to remove the flood cover member (80).

13 Claims, 18 Drawing Figures

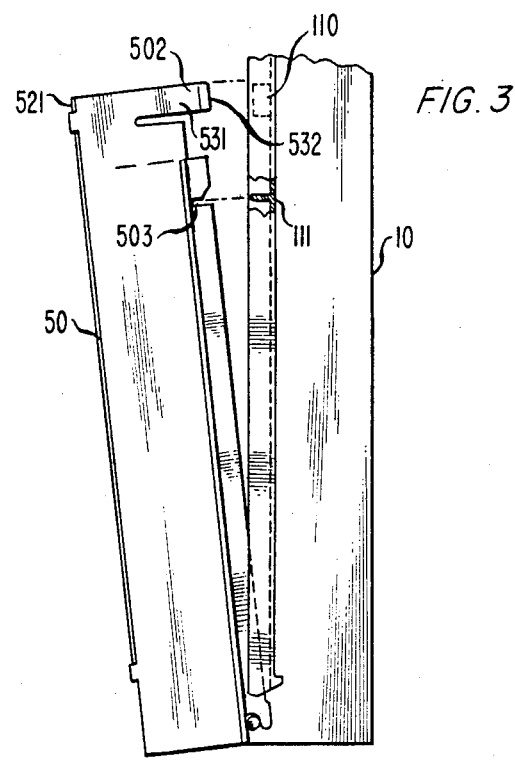
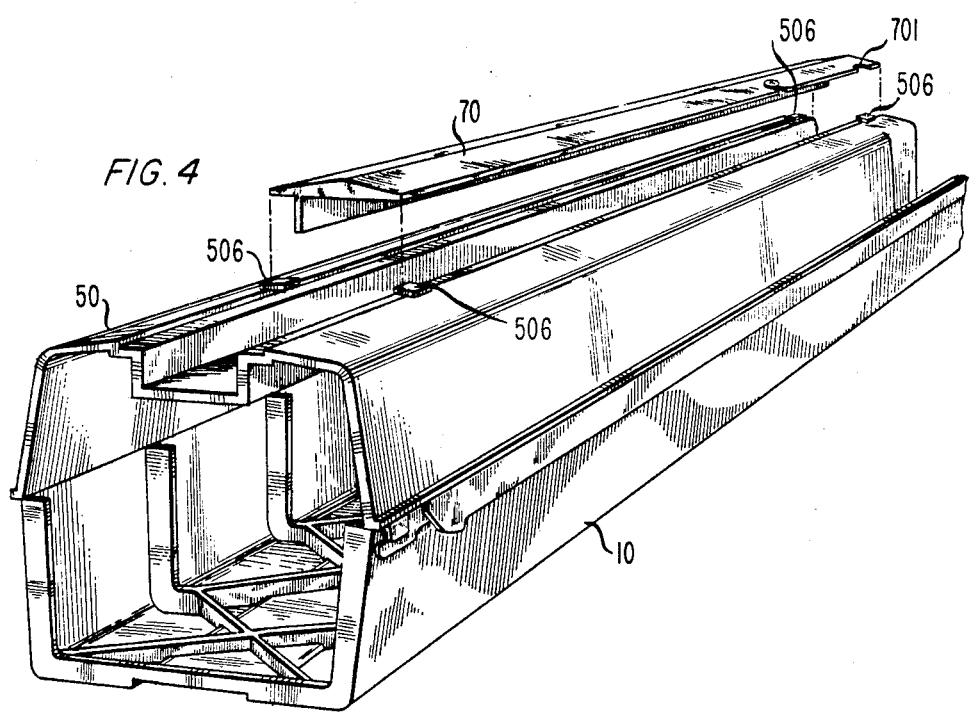

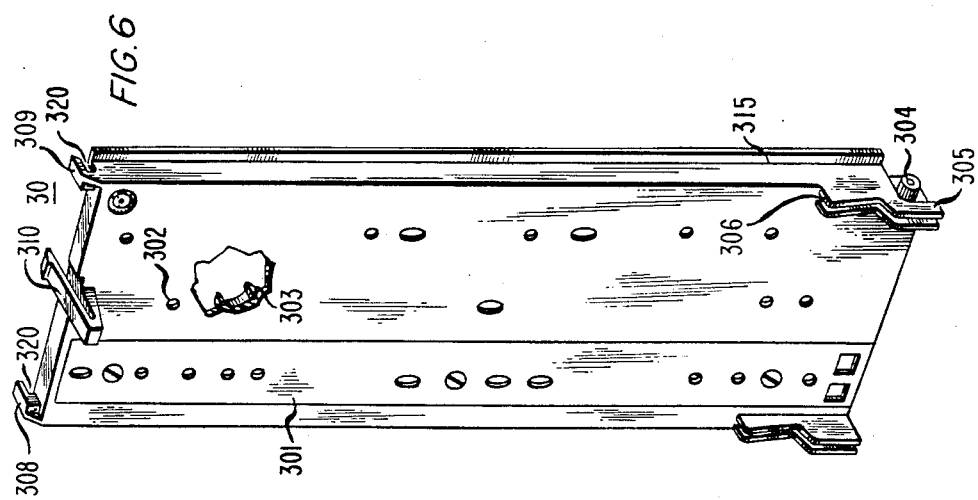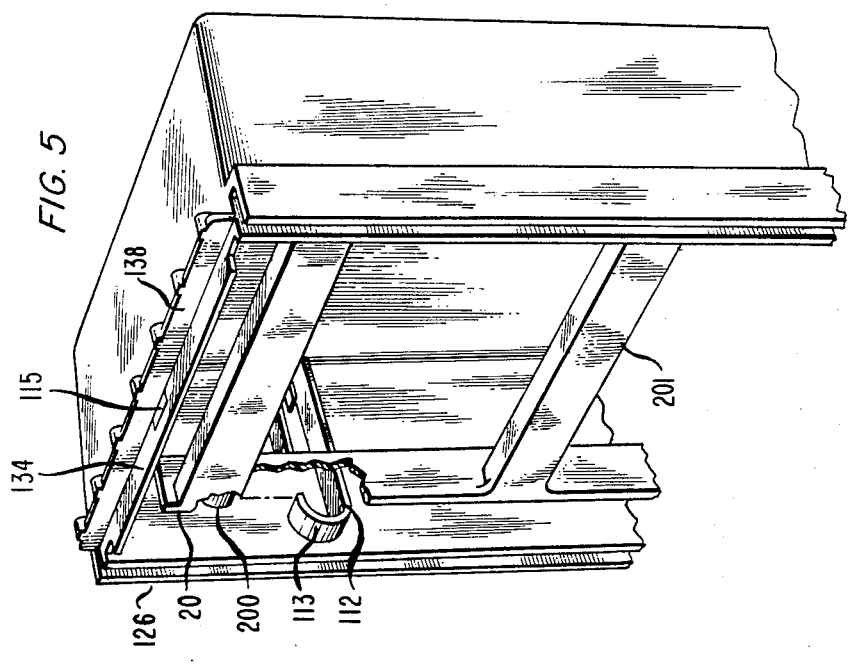

FIG. 15
FIG. 16
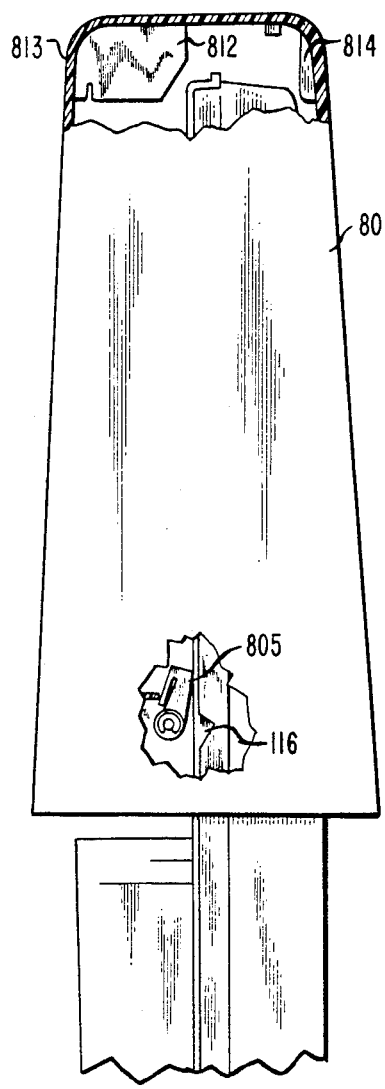
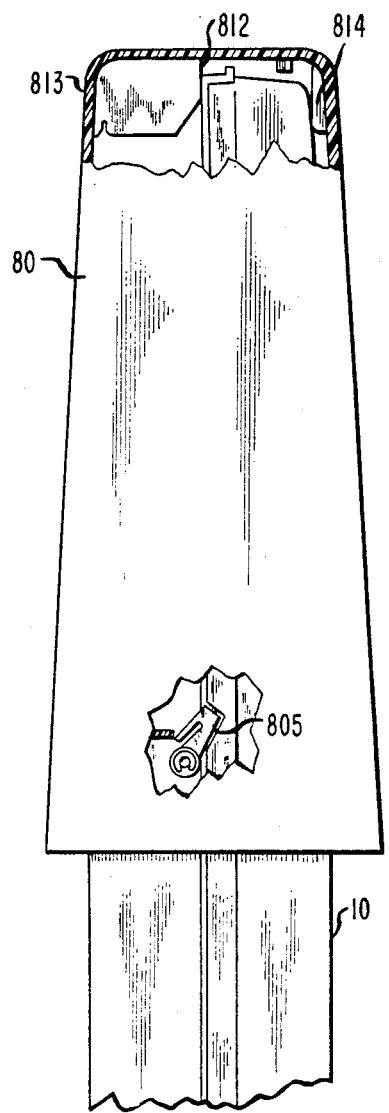

FIG. 17
FIG. 18
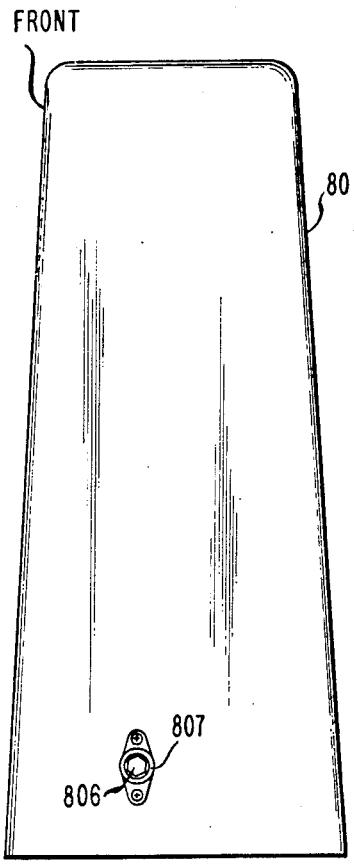
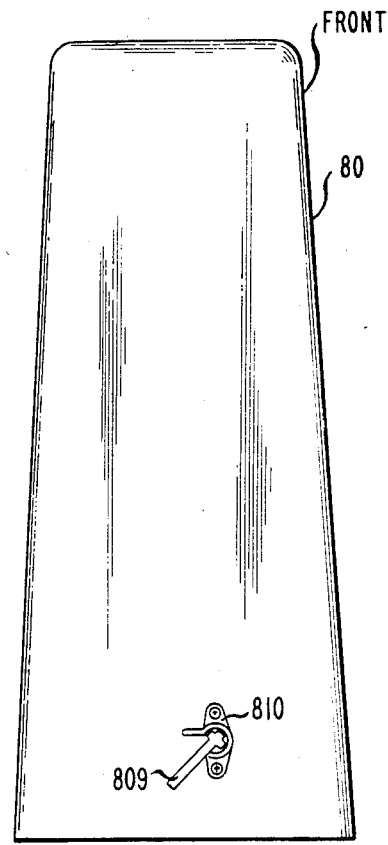
RIGHT SIDE VIEW
LEFT SIDE VIEW

CABLE TERMINAL PEDESTAL

BACKGROUND OF THE INVENTION

This invention relates to above ground splicing for connection terminals or closures, for buried utility cables and particularly buried telephone cables.

DESCRIPTION OF THE PRIOR ART

Pedestal cable closures are installed along buried cable routes where it is desired to make connections of either aerial or buried conductors to the conductors within such buried cable, e.g., to connect service wires thereto or to join the ends of two cables. These closures are commonly provided to shelter splices or terminal connections between service wires or distribution wires and buried utility cables such as telephone cables. It is important that these closures be weather-tight to protect connections from the outside environments, e.g., the entry of damaging wind blown contaminants, dirt, insects, snow, and precipitation. Also, a buried pedestal cable closure should be sufficiently resistant to unauthorized entry to inhibit or at least discourage vandals from gaining access to the electrical circuitry and for unauthorized service personnel from accessing certain inside chambers and, thus, altering those connections or splices which are not within the scope of their responsibility.

On the other hand, the pedestal closure should be one that is easily disassembled and assembled both at the time of its installation and when needed for authorized service personnel to alter connections or install or remove wires and cables. The tasks of making the original splices and terminal connections and thereafter making additional connections require maximum access to the wires inside the pedestal. Consequently, the closure should not impede access by authorized personnel.

There are pedestal closures that have addressed the problems associated with these seemingly contradictory purposes. U.S. Pat. No. 4,058,670 issued on Nov. 15, 1977 in the name of M. L. Leschinger, for example, describes a cable enclosure that is provided with a disassembly mechanism such that only authorized personnel with a special tool can enter the enclosure.

Although the above-mentioned pedestal cable closure is one of several viable alternatives, there are problems associated with most previous closures. The pedestal closures are generally constructed of parts formed from sheet metal. These metal parts because of their exposure to rain, snow and other environmental elements become corroded over a period of time. This corrosion may affect the integrity of the electrical connections within the enclosure. Also, corrosion can make the pedestal closure difficult to service because the attachment points of the interconnected parts comprising the enclosure oftentimes lock together and in effect become "frozen." In severe cases, corrosion can render the closure useless in protecting the contents from direct exposure to the environment.

Another problem is that the parts comprising the above-mentioned metal pedestals are heavy and cumbersome for the installer or a repairman to handle. Finally, metal pedestal closures require extensive machining or forming of the interrelated parts to facilitate assembly thereof. Generally, the sheet metal has to be modified in some way after the forming process to allow for attachment of the various members that reside within the closure. The machining and modifications required are often time consuming in addition to being expensive. Also the metal must be coated with corrosion resistant material such as a galvanizing metal or paint. It would be a benefit therefore to find some alternative material to the metals traditionally associated with the construction of pedestal closures for underground cable.

What is needed is a pedestal closure that can overcome the above-mentioned problems associated with metallic pedestal closures. Also, the pedestal closure should be one that is able to retain the positive characteristics of previous pedestal closures, that is, being resistant to unauthorized entry and at the same time being easily accessible to authorized personnel.

SUMMARY OF THE INVENTION

In accordance with my invention an improved pedestal closure for buried cables is disclosed. The pedestal closure is constructed generally of plastic parts to allow it to be more weather and corrosion resistant than previous pedestal closures. Features can be molded into various members comprising the pedestal closure that heretofore had been provided in the pedestal in other ways. In accordance with my invention, the various members of the pedestal closure are now described in the following discussion.

The pedestal closure includes a rear member which is the longest member and to which generally all other members are attached. The rear member has a back section and grooves along each of its sides. The grooves are one part of a tongue and groove mating arrangement provided between upper and lower front members and the rear member. The rear member also has several attachment points for other portions of the pedestal closure. These attachment points will be described along with the other members of the pedestal closure to which they interconnect.

An electrically conductive bond bar assembly is attached to the rear member in a generally middle portion thereof. The bond bar assembly provides electrical continuity between the metallic shield within the service wire and an underground cable. A lower front member, with a front section and rearwardly extending sidewalls, is attached to the rear member at a generally lower portion. In this embodiment, the sidewalls of the front member provide other projecting edges or tongues for the tongue and groove mating arrangement with the rear member. With the lower front member in place, its upper portion is located slightly below the attachment point of the ground bar assembly. A channel cover member is adapted to cover a front channel provided in the lower member for service wires entering the pedestal. The channel cover member is attached to the lower front member by clips that are integral parts of the lower front member.

A support ladder is attached to an upper portion of the rear member. The support ladder provides a means for entering buried cables to be separated and supported when connections are to be made within the pedestal closure.

A backboard assembly is attached to the upper portion of the rear member in a position covering the support ladder. The backboard assembly permits attachment of different types of terminal blocks and electrical connections thereto. The assembly also contains a metal plate which provides for a ground connection for electrical protectors which may be contained within the terminal blocks.

An upper front member is attached to the upper portion of the rear member. The upper front member covers the backboard assembly, the ground bar assembly and also protects connections within the pedestal closure. The upper front member of this embodiment can be one of two types, either a standard member for normal weather conditions or a cover member designed for flood conditions.

The standard member comprises a front section and rearwardly extending side walls which fit into the grooves of the rear member. In addition, the standard member has a latching member arrangement for securing the standard member to the rear member. The standard member is mateably engaged to the lower front member when the standard member is in its locked and down position. A bolt is attached to and utilized to actuate the latching member for disengagement of the rear and standard members. The bolt head in this embodiment is surrounded by a socket member or collar. The socket member is configured in such a way that only a person with a special tool can remove the standard member from the closure, thereby providing for a tamper resistant closure.

The flood cover member which can be utilized interchangeably with the standard front member is a polygonal shaped member with a hollow inside portion. The flood cover member is dimensioned such that it will surround the upper section of the rear member, thereby protecting the parts of the assembly contained therein. The flood cover member of this embodiment has a latching member on each side that will automatically secure the flood cover member to the rear member when the flood cover member is in a down and locked position. In this embodiment, the latching members are required to be disengaged simultaneously to remove the flood cover member.

All of the above-mentioned members with the exception of the bond bar assembly are formed largely from plastic material. The members can be formed using a molding process, such as injection molding, thus allowing various features within the different members to be integral parts thereof.

The above-described assembly is lighter in weight, corrosion resistant, and provides the opportunity to incorporate into the pedestal, because of the plastic parts associated therewith, design improvements difficult to obtain in previous metal pedestal designs.

BRIEF DESCRIPTION OF THE DRAWINGS

FIG. 3 is a view depicting the attachment of a lower front member to a rear member of the pedestal;

FIG. 4 is a horizontal perspective view of a channel cover member being attached to the lower front member;

FIG. 5 is a view of the rear member and a splice support ladder;

FIG. 6 is a view of the backboard assembly of the pedestal closure;

FIG. 15 is a cutaway side view of the flood cover with a latch member exposed;

FIG. 16 shows the same view as FIG. 15 with the latch member rotated;

FIG. 17 is a side view of the flood cover; and

FIG. 18 is a view of the other side of the flood cover showing the side opposite that of FIG. 17.

DETAILED DESCRIPTION

Figure 1:
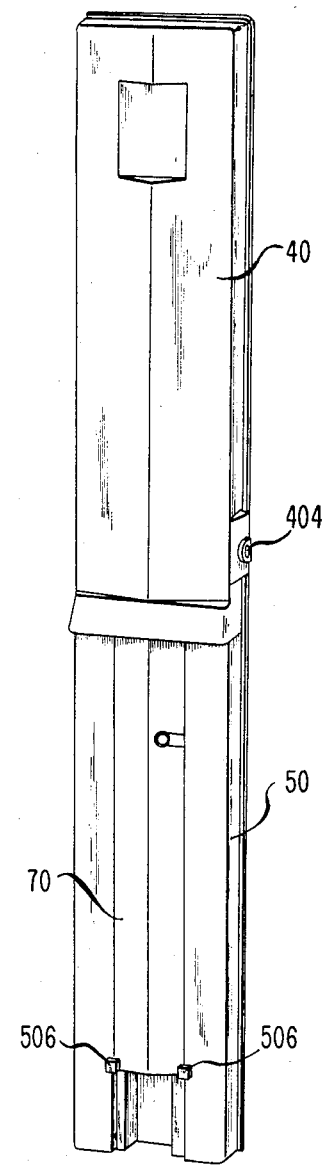
FIG. 1 is a perspective view of one embodiment of the invention.

FIG. 1 is a view of one embodiment of a pedestal closure 3 of my invention completely assembled. In use, a bottom portion of the pedestal closure 3 will be buried underground. The pedestal closure 3 is comprised principally of plastic material except those places where electrical connections are to be made as will be later discussed.

The plastic material utilized must have two properties, toughness and fire-resistance. A typical plastic that provides these two properties is polycarbonate (PC) and is one of several suitable candidates for the pedestal closure. By making the constituent parts of the pedestal closure 3 principally from plastic material, certain features, particularly attachment points for the interconnected members which heretofore had to be either added on or cut away from traditional metal pedestals, can now be simply molded in thereby making the assembly easier to manufacture. The resulting assembly is easier to assemble and it is also easier to handle because of the lighter weight of the plastic parts.

Figure 2:
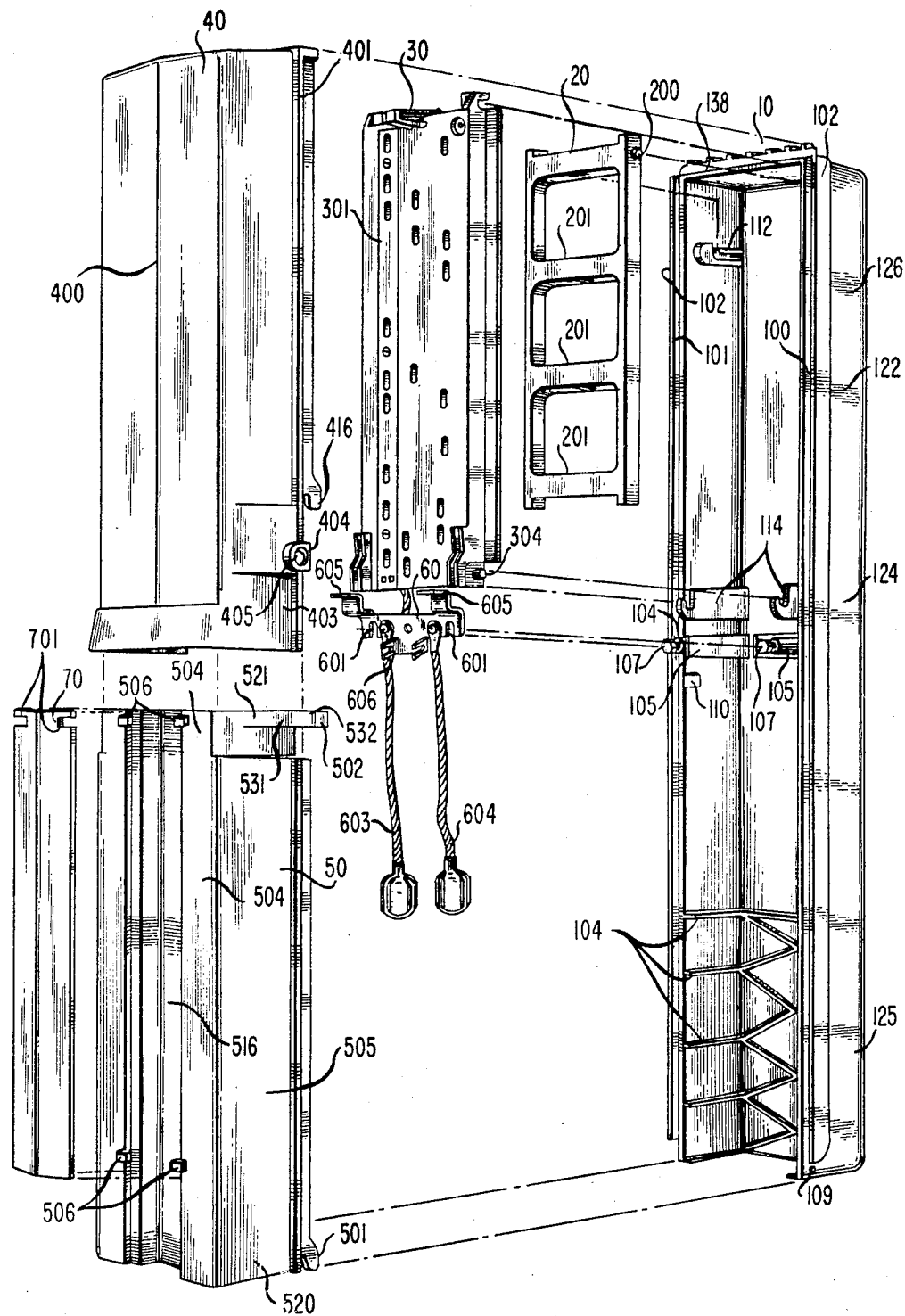
FIG. 2 is an exploded view of FIG. 1.

FIG. 2 which is an exploded view of pedestal closure 3 of my invention shows the interconnected members in more detail. In this embodiment a rear member 10 to which the other members and assemblies are attached has the longest dimension and contains many features that will be fully described in the following discussion.

The rear member 10 in this illustrative embodiment has channels or grooves 100, 101 along the entire length of its frontwardly extending sidewalls 122 for providing a tongue and groove fit with the members it engages. Siderails 102 perform two functions: (1) they provide the outside portion of grooves 100, 101 to allow for the mating attachment of one type of front member to the rear member 10 and (2) they also provide for attachment of another type of front member to the rear member.

During installation of the pedestal closure 3 in accordance with conventional practice, the lower portion of the pedestal closure is filled with a rock gravel. As can be observed in FIG. 2, a one-half portion of a symmetrical rib-like grid structure 104 is shown. The internal projections of rib-like grid structure 104 serve to provide stability for the pedestal closure 3 by preventing heaving from frost and also resistance to buoyant forces during flooding conditions when the pedestal closure is assembled in accordance with FIG. 13. Simply stated, grid structure 104 keys the pedestal closure to the gravel bed.

An electrically conductive member in this embodiment, a bond bar assembly 60, is attached to the rear member 10 at terminal points 105 in a generally middle portion 124 thereof. The terminal points 105 in this embodiment are integral to the rear member 10. Fasteners 107 such as bolts or screws can be inserted into points, or standoffs 105. Thereafter, the bond bar assembly 60 can be placed over the shank of the fasteners 107 via slotted openings 601. Thereafter, fasteners 107 can be screwed into place to secure the bond bar assembly 60 to the rear member 10. Bond bar assembly 60 provides electrical shield continuity across a cable sheath opening, electrically bonds the shields of all service wires to a cable shield and finally may be used for direct grounding of the bond assembly by attaching a ground wire to the ground lug 606 on the bond bar assembly 60. This interconnection of ground and cable shields is facilitated by conductive straps 603 and 604 which are each terminated by a connector.

Lower front member 50 is attached to the rear member 10 at a lower section 125 of the rear member 10 via an engagement arrangement that utilizes features integral to both the rear member 10 and lower front member 50. Thus there is no attachment hardware required. Lower front member 50 has a front section 504 with rearwardly extending sidewalls 505. The sidewalls 505 provide the tongue in the tongue and groove mating arrangement with the rear member 10.

The lower front member 50 as indicated extends from a position just below the terminal points 105 of the bond bar assembly 60 to the bottom section 125 of the rear member 10. Hooks 501 are on each side of the member 50 at a lower section 520, while snap latches 502 are on each side at an upper section 521. Snap latch member 502 comprises integral rearwardly extending members 531 with an outwardly extending rectangular projecting portion 532 on each side. Each projecting portion 532 is adapted to be retained in recesses 110 of rear member 10.

The recesses 110 in this embodiment are rectangular in shape to accommodate the projecting portions 532. In no way, however, should rectangular be thought of as the only geometric configuration of the projecting portions 532 or recesses 110. The hooks 501 of the lower front member are engaged by projecting members 109 which in this illustrative embodiment are depicted as bosses located at a lower section 125 of the rear member 10.

Referring now to FIG. 3 there is shown a side view of the lower front member 50 being attached to the rear member 10. When the lower front member 50 is pushed toward the rear member 10, the projecting portions 532 are engaged in the recesses 110 of the rear member 10. If the rearwardly extending portions 531 of the lower front member 50 are squeezed from their sides, the projecting portions 532 of the snap latch arrangements will be disengaged and thus can be removed from the recesses 110 of the rear member 10. A locating slot 503 in the top section of lower front member 50 engages a cross rib 111 in each groove of the rear member 10 and provides for positive positioning of the upper section 521 of the lower front member 50 to provide a good fit with an upper front member.

Referring back to FIG. 2, a channel cover member 70 engages the front section 504 of lower front member 50. The cover member 70 provides protection for service wires (not shown) which pass through channel 516 in the lower front member 50 and can be connected to terminal blocks within the pedestal closure. FIG. 4 illustratively shows the connection of the channel cover member 70 to lower front member 50. The connection is made as indicated by sliding the cover 70 behind four clips 506 molded into the lower front member 50. The two cutouts 701 at an upper end of the cover 70 facilitate attachment of the cover member 70 to the lower front member 50. The pair of cutouts 701 are more clearly illustrated in FIG. 2.

Support ladder 20 (FIG. 2) provides a means for entering cables to be separated and supported. For example, if several groups of cables are to be connected to terminal blocks in the pedestal, the ladder 20 could serve as a way to separate each group by looping each cable around the rungs 201 of the ladder. Thereafter, the cables, if they are to be spliced together, could be properly dressed thereto and the splicing function could be accomplished. It is seen that splice support ladder 20 has projecting members, or hinge pins 200 which engage tracks 112 located at a top section 126 of rear member 10. The hinge pins 200 are advantageously integral to each side of the splice support ladder 20.

Referring to FIG. 5, a front portion 113 of each track 112 is in a closed position to prevent the ladder 20 from sliding out of the tracks 112. The ladder 20 is formed from plastic material in much the same way as the before-described members. The features associated with the ladder 20 that facilitate its attachment to rear member 10 and also allow the ladder 20 to support the cables are also integral thereto.

Backboard assembly 30 (FIG. 2), located at a position covering splice support ladder 20, is utilized for terminal blocks (not shown) associated with the pedestal closure 3. It also provides a physical barrier to isolate all of the cable conductors from access by unauthorized personnel. A terminal block typically provides the means for connecting a customer's telephone set via a service wire to a particular underground cable pair. The assembly 30 also contains a ground bar 301 to provide electric grounding for terminal blocks which have high voltage protectors associated therewith.

Referring to FIG. 6, openings 302 are utilized to mount the terminal blocks to the assembly 30. On the opposite side of the assembly 30 shown by the cutaway portion of FIG. 6 is a plastic collar 303 that surrounds the openings 302. The collar 303 serves to prevent unsheathed cable pairs as well as spliced wire which would be located behind the assembly 30 from making electrical contact with either the ground bar 301 and/or any hardware required to secure the terminal blocks to the front of the assembly 30. The backboard assembly 30 attachably engages the rear member 10 via projecting members or hinge pins 304 at a bottom section 315 of the assembly 30.

Figure 7:
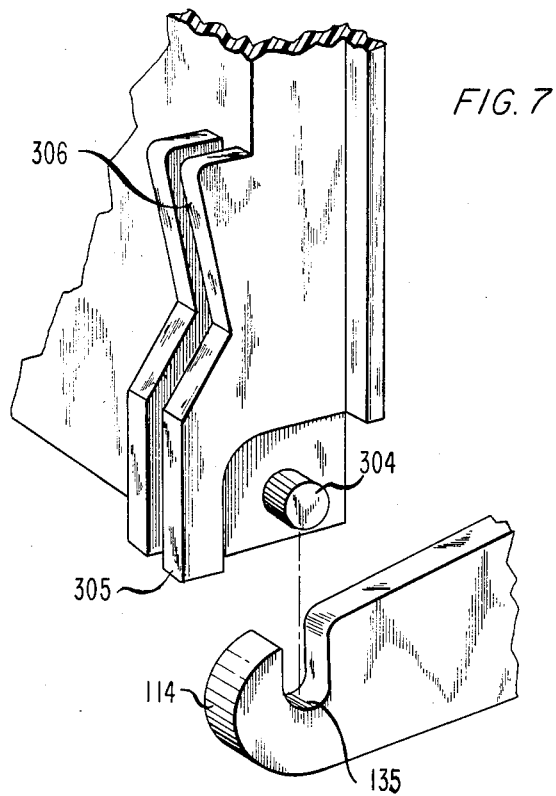
FIG. 7 is a cutaway view of the attachment of a backboard assembly to the rear member.

FIG. 7 shows a hinge pin 304 of the backboard assembly 30 about to be placed in semicircular openings 135 of a hinge support post 114 of the rear member 10. There is a molded fender 305 on each side of the backboard which surrounds pin 304. When hinge pin 304 is placed in semicircular opening 135, fender 305 on two sides surrounds the hinge support post 114 which is integral to rear member 10. The fender 305 and hinge support post 114 arrangement, by their configuration, prevent the hinge pin 304 from leaving the opening 135 of the hinge support post 114 when the backboard assembly 30 is in an open and down position.

Figure 8:
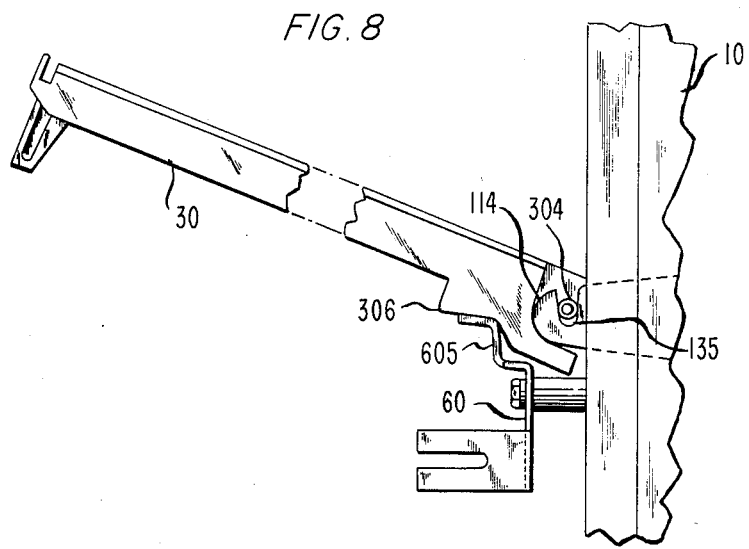
FIG. 8 shows the backboard assembly in an open position for service personnel to make connections thereto.

As seen in FIG. 8, when the assembly 30 is in the open position there is a set of ribs 306 on each side of and integral to the assembly 30 which rests against projecting portions 605 on the bond bar assembly 60. The hinge pins 304 are not stressed by the cantilever load of the backboard assembly 30 because the assembly 30 is designed such that as the assembly 30 rests against the portions 605, the fenders also react against member 135 and simultaneously lift the pins 304 out of the openings 135. Thus, there is no load on the pin 304 as indicated in the Figure.

Figure 9:
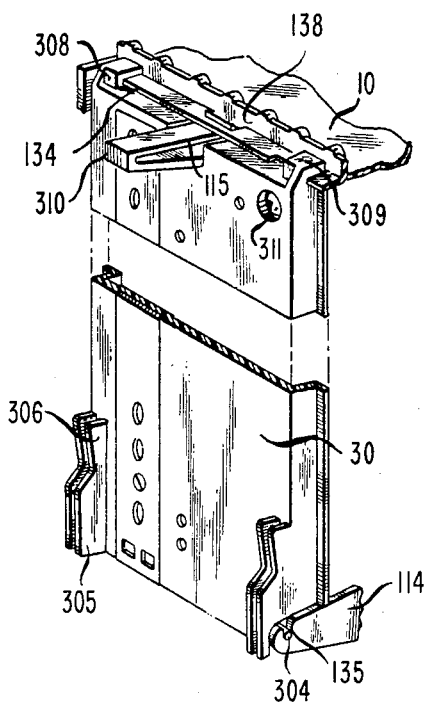
FIG. 9 shows the backboard assembly in an upright position.

FIG. 9 shows a cutaway perspective of the backboard assembly 30 in an upright and secure position with rear member 10. The backboard and its upper section contains guides 308, 309 and snap latch 310. The guides 308, 309 serve three functions: (1) they engage a top edge 134 of the rear member 10 via slots 320 (FIG. 6) (2) they align the snap latch 310 to insure that the latch 310 will properly engage a slot 115 in the top edge of rear member 10, and (3) they lift the backboard assembly 30 to prevent the possibility of the hinge pins 304 jamming in the openings 135 of the hinge support posts 114. Also, in addition to the snap latch 310 and guides 308, 309 arrangement, there is a screw 311 which could be utilized in conjunction with a threaded hole (not shown) in rear member 10 to further secure the assembly 30 to the rear member 10. Screw 311 requires a special tool which permits certain personnel to enter the area behind the backboard assembly 30.

For final assembly of the pedestal closure 3, an upper front member is required. In FIG. 2, as can be seen, is one type of front member hereinafter referred to as the standard upper front member 40. The standard upper front member 40 comprises a front section 400 with rearwardly extending sidewalls 401. In addition, at a lower section 403 of the standard upper front member 40 is a hook member 416 and a bolt head 405 which is surrounded by socket member 404.

Figure 10:
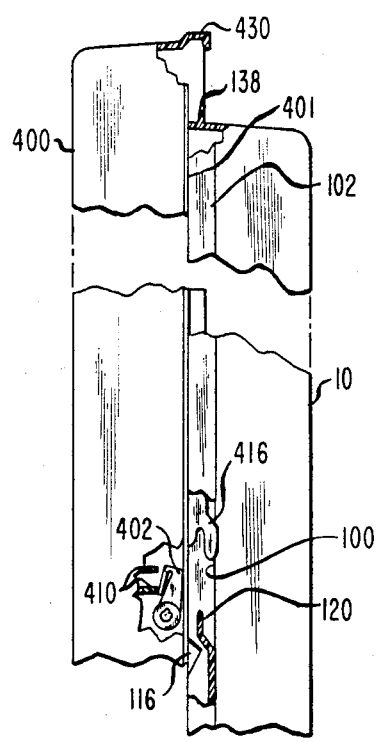
FIG. 10 shows in a cutaway view the latching member of the pedestal closure.
Figure 11:
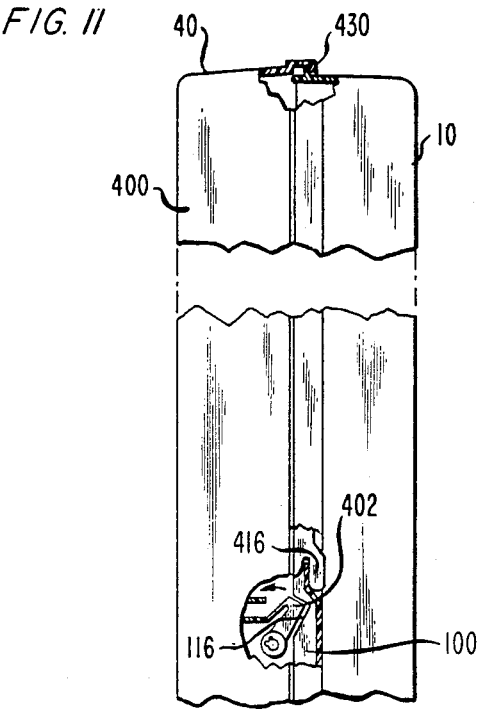
FIG. 11 shows the same view as FIG. 10 with the upper front member in a down and locked position.

FIG. 10 illustrates by cutaway side view perspective how the standard upper front member 40 is engaged and latched to the rear member 10. Rearwardly extending side walls 401 engage the grooves 100 on each side of the rear member 10. The side walls 401 can be inserted therein and then member 40 can be pushed downward. Latching member 402 as seen in the cutaway view is biased against the sidewalls by projecting member 410. When the member 40 is pushed downward a sufficient distance as shown in FIG. 11, hook member 416 of the front member 40 engages a flange 120 of the rear member 10 and also a lip 430 at top of member 10 engages a flange 138 of rear member 10. The latch member 402 simultaneously engages a detent 116 in the rear member 10, thus locking the front member 40 to the rear member 10.

Figure 12:
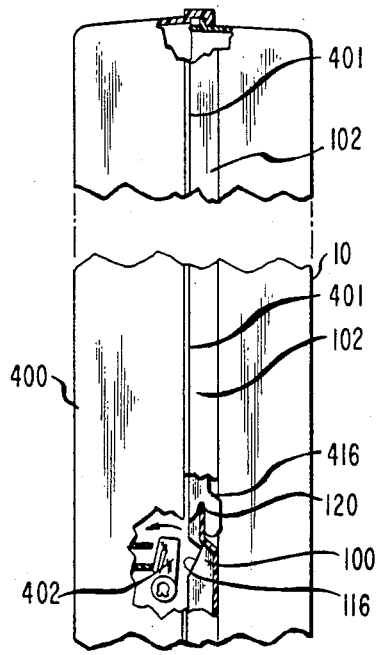
FIG. 12 shows the same view as FIG. 11 with the latch member rotated.

As seen in FIG. 12 when the latch member is rotated out of the detent 116, the front member 40 can then be pulled up a short distance to free the engagement of hooks 416 and lip 430 and thereafter front member 40 can be lifted away from the rear member 10. A more detailed explanation of the operation and construction of the latch member 402 is contained in co-pending application Ser. No. 454,158, filed Dec. 29, 1982 which is incorporated by reference herein.

Referring back to FIG. 2, it can be seen that a close fitting circular socket member 404 surrounds a bolt head 405 of the latching member 402 and prevents the use of standard socket wrenches. A special tool can advantageously be used to turn the bolt head 405 to facilitate removal of the front member 40. The circular socket member 404 thus helps prevent unauthorized personnel from entering the pedestal closure.

The latching member 402 (FIGS. 10, 11 and 12) is preferably made of plastic material. The features in the rear member 10 and front member 40 that accommodate the latching member 402 are advantageously integral to the respective members via the plastic molding process.

Through the cooperation of these features with the latching member 402 a pedestal closure which is light weight, but resilient is provided that prevents unauthorized entry, and in addition, is not as affected by the environment as previous metal pedestals. In areas of high water, however, additional protection may be required.

Figure 13:
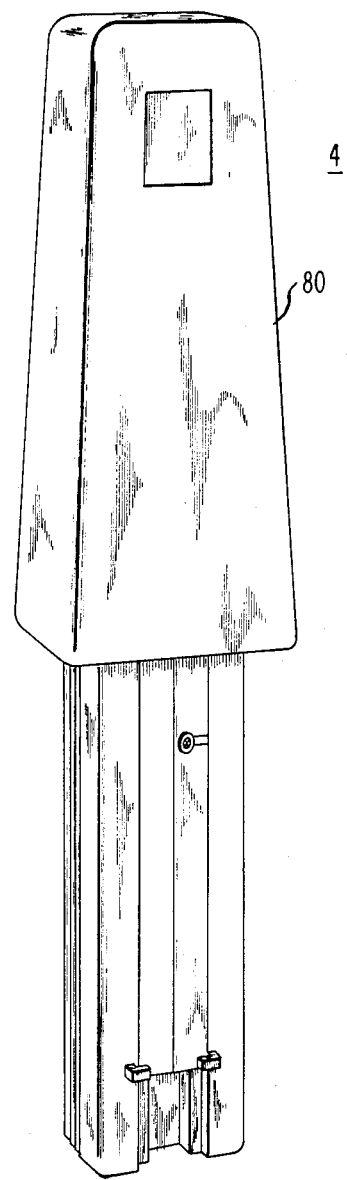
FIG. 13 is a perspective view of a pedestal closure with a flood cover attachment.

FIG. 13 illustratively depicts a pedestal closure 4 with an upper front member 80 that protects for flood conditions. The upper front member 80 of this embodiment will hereinafter be called a flood cover member. The pedestal closure 4 of FIG. 13 is the same in all respects to that of FIG. 2 except that the standard front member of FIG. 2 is replaced with the flood cover member 80. The flood cover member 80 is a polygonal-shaped member that has a hollow section in its interior to provide for a so-called "bell jar effect."

Figure 14:
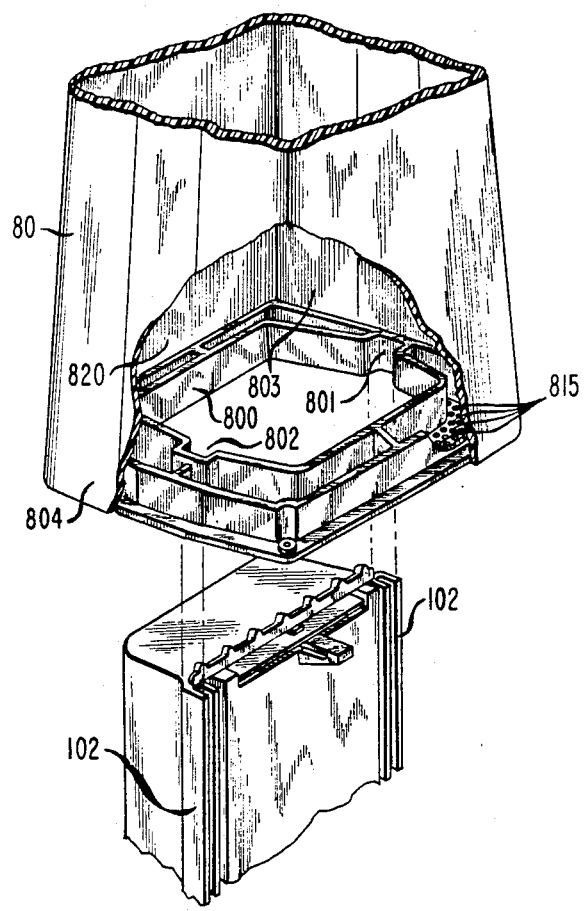
FIG. 14 is a view of a flood cover about to be mateably attached to the rear member.

As seen in FIG. 14, the flood cover member 80 has an inner flange 800 at a lower section 820 which contains grooves 801 and 802 on opposite sides 803 and 804. Grooves 801 and 802 are mated to and slide over side rails 102 of the rear member 10. A combination of venting and drainage is provided in the flood cover member 80 by a circumferential array of holes 815 shown in FIG. 14. Holes 815 provide sufficient ventilation of air within the pedestal closure to prevent condensation during normal or non-flood conditions. During a receding flood condition, holes 815 provide drainage of any water forced up into the lower portion of the flood cover member 80.

As best can be seen in FIGS. 15 and 16, when the flood cover member 80 reaches a lower position, there are two latching members 805 (only one side shown) connected thereto which fall into detents 116 on each side of the rear member 10 in much the same way as described in the standard member 40 of FIG. 1, thus, automatically locking the flood cover member 80 in place.

The flood cover member 80 utilizes latching members 805 which operate similarly to latching member 402 as before described in the standard member, the differences being explained in the following discussion. Referring to FIG. 17, bolt 806 connected to latching member, 805 (shown in FIG. 16) is actuated in the same way as before-described in the standard cover member. That is, a special tool designed to clear the reduced space provided by collar 807 is required to turn the bolt 806 in a counter-clockwise direction to release latching member 805.

On the opposite side of flood member 80 as shown in FIG. 18, however, is a handle 809 which is attached to latching member 805. Thus, a service person can use his or her free hand to turn handle 809 in a clockwise direction against the stop provided by projecting enclosure 810 while simultaneously turning the bolt 806 with a special tool to release the latching member 805 from rear member 10 and thereafter, remove the flood cover member 80 from the rear member 10. The automatic locking feature takes on particular importance in the context of the flood cover member 80, because the feature assures that as the cover is lowered into place, it is automatically locked to prevent high waters from disengaging the cover member 80.

The cover member 80 also contains at a top section 813 as shown in FIGS. 15 and 16 a series of ribs 812 and 814 (one shown). The ribs 812 and 814 advantageously key the flood cover member 80 to the rear member 10, thus preventing the flood cover member 80 from moving in a front to back fashion.

As before mentioned, the flood cover 80 acts as a "bell jar" to trap air and prevent water from reaching a position in contact with the telephone wire connections. The flood cover member 80 can be utilized interchangeably with the standard member 40 to protect the electrical connections made within the pedestal closure installation. While a particular type of polygon shape is shown in this embodiment of the flood cover member 80, it is well recognized by those skilled in art that a wide variety of shapes could be utilized for flood cover member 80 and still be within the spirit and scope of my invention.

The pedestal closure as described in my invention has several major advantages. First, several of the before-described features such as the tongue and groove fit of the rear member to the upper front member, the latching detents, the tracks for the support ladder and the hooklatch arrangement of the backboard assembly have been incorporated into the design of the respective members.

All of the before-described features can be incorporated integrally into the various members via a plastic molding process. In contrast, by forming a pedestal closure from sheet metal, as has been done previously, the metal has to either be modified to accommodate the before-described features or the features associated therewith would have to be added to the sheet metal instead of being incorporated in the design. Secondly, the parts associated with my invention are lighter in weight than those associated with previous closures thereby facilitating easier installation of and repair to the pedestal closure. Finally, this closure avoids the known corrosive effect of precipitation on previous pedestal closures due to its use of plastic material in lieu of the sheet metal parts generally associated therewith.

In all cases it is to be understood that the above-described embodiments are illustrative of just two of many possible specific embodiments which can represent applications of the principles of the invention. Thus, numerous and various other embodiments can be devised readily in accordance with these principles by those skilled in the art without departing from the spirit and scope of the invention.

What is claimed is:

1. A pedestal cable closure for above-ground terminals of a buried cable installation comprising:
    a rear member having a vertically elongated rear wall and forwardly projecting sidewalls, the sidewalls each including a groove extending essentially the length of the sidwalls, the rear member also having upper and lower sections, the upper section including a raised flange on its upper surface extending between the sidewalls, an internal flange in the groove of each sidewall, the lower section including a pair of apertures at one end and projections at the other end of each sidewall of the lower section;
    a lower front member with rearwardly extending sidewalls, the lower front member being adapted to fit securely to the lower section of the rear member, the rearwardly extending sidewalls each including an integral snap latch tab at one end for mating with one of the pair of apertures in the lower section of the rear member, the rearwardly extending sidewalls of the lower front member each including a hook projecting therefrom for engagement with the projections; and
    an upper front member adapted to be secured to the upper section of the rear member, the upper front member having rearwardly projecting sidewalls for engagement with the grooves, the upper front member including a pair of hooks projecting from the sidewalls for extending into the grooves to engage with the internal flanges and a raised lip adapted to slide over the raised flange of the rear member to provide a weatherproof assembly on the top of the pedestal cable closure.

2. The pedestal cable closure of claim 1 wherein each internal snap latch tab extends beyond its sidewall and the extremity of the snap latch tab includes an outwardly extending projection adapted to seat and lock into one of the pair of apertures when the lower front member is mated with the rear member for securing the lower front member to the rear member.

3. A pedestal cable closure for underground cable connections comprising:
    a rear member with upper and lower portions and forwardly projecting sidewalls, a lower front member with rearwardly projecting sidewalls adapted to be mated with the rear member, the rear member including a groove at the extremity of each of its forwardly projecting sidewalls and the lower front member including a tongue at the extremity of each of the rearwardly projecting sidewalls to provide a tongue and groove seal between the lower front member and the rear member; the lower front member further including snap latch members integral to said rearwardly projecting sidewalls, said snap latch members adapted to hold the lower front member to the rear member;
    the rear member further including tracks on the interior side of the forwardly projecting sidewalls in the upper portion, a cable support ladder adapted to fit in the tracks of the upper portion of the rear member for supporting cables for splicing;
    a backboard support assembly attached to the upper portion of the rear member;
    an upper front cover with rearwardly projecting sidewalls adapted to be mated with the rear member, the sidewalls including a tongue at the extremity of each sidewall for mating with said grooves at the extremity of each sidewall of the rear member to provide a tongue and groove seal between the upper front cover and the rear member; and
    a self-locking latching mechanism activated when the upper front cover is lowered vertically against the rear member.

4. A pedestal cable closure made essentially from a plastic material for above ground terminals of a buried cable installation comprising:
    a rear member having a vertically elongated rear wall and forwardly projecting sidewalls forming an interior cavity therein, the rear member having upper and lower sections, the sidewalls each including a channel extending along its sidewall edge, the upper section including an opening in a projecting lip spanning the region between the upper extremity of its sidewalls, the rear member also having a pair of spaced apart support members each located near a sidewall in the lower portion of the upper section;

a backboard assembly adapted to be attached within the interior cavity of the upper section of the rear member, the backboard assembly having a latching mechanism at an upper portion with guiding means at each side of the latching mechanism, the latching mechanism adapted to snap into the opening in the projecting lip of the rear member, and the guiding means having slots to engage the projecting lip of the rear member, the backboard assembly having hinge pins laterally extending from its lower portion each adapted to be mated to a slot of one of the support members in the rear member, the backboard assembly having a pair of lateral ribs extending up from its lower edge;

an electrically conductive member adapted to be attached in the interior cavity of the upper section of the rear member, the conductive member having openings which accommodate connection to the rear member, the conductive member further having projecting portions for supporting the set of ribs integral to the backboard assembly when the backboard assembly is in an open position;

a lower front member adapted to be secured to the lower section of the rear member; and an upper front member adapted to be secured with the upper section of the rear member, the upper front member having rearwardly projecting sidewalls for engagement with the channels, the upper front member covering the backboard assembly and the conductive member, the upper front member including an attachment means to secure the upper front member to the rear member.

5. The pedestal cable closure of claim 4 where the pair of lateral ribs have a first portion which extends below the hinge pins and rests against the underside of the support members and an upper portion which rests against the topside of the projecting portions of the electrically conductive member when the backboard assembly is lowered, thereby freeing the hinge pins of strain.

6. A pedestal cable closure for providing connection between buried telephone cables and customer service wire, the closure comprising:

a rear member with a back portion and forwardly projecting sidewalls extending along the length of the rear member, the rear member having an upper end surface joining the upper ends of the projecting sidewalls and an interior cavity defined between its sidewalls, the upper end surface, and back portion, the rear member further having upper, middle, and lower sections, the extremities of the sidewalls having grooves, the rear member having a pair of first projecting members extending in laterally opposing directions from the sidewalls of the lower section and a pair of recesses located in the inside of each sidewall in the top region of the lower section, and a single recess located in the upper end surface;

a lower front member to be attached to the rear member at a position over the lower section below the middle section, the lower front member having a front section and rearwardly extending sidewalls whose edges fit into the grooves of the rear member, the upper portion of each sidewall of the lower front member having an integral snap latch tab and the lower portion of each sidewall of the lower front member having an integral hook member each of which is adapted to be mated with a first projecting member of the rear member when the snap latch tabs fit into the pair of recesses;

a splice support ladder to be attached in the interior cavity of the upper section of the rear member;

a backboard assembly to be connected to the upper section of the rear member to close off the interior cavity portion containing the splice support ladder, the backboard assembly including an integral latching member at a top section for engaging the recess in the upper end surface, guiding means at each side of the integral latching member for positioning the backboard assembly in relation to the rear member; and an upper front member having a front section and rearwardly projecting sidewalls whose edges fit into the grooves of the rear member, the upper front member including a latching member to secure the upper front member to the rear member.

7. The pedestal cable closure of claim 6 wherein the pair of tracks are located in the interior cavity of the rear member on opposite sidewalls and the splice support ladder includes a pair of laterally extending projecting members for slideable engagement with the pair of tracks of the rear member.

8. The pedestal cable closure of claim 7 wherein the rear member includes a pair of internal flanges each located in the grooves in the middle section and wherein the upper front member includes a pair of projecting hooks each adapted to slide over an internal flange for holding the upper front member against the rear member.

9. The pedestal cable closure of claim 6 wherein a screw secures the backboard assembly to the rear member and the screw has a head design which is operable by a special tool.

10. The pedestal cable closure of claim 9 wherein the backboard assembly includes a ground bar and a plurality of holes in a pattern for facilitating the mounting of a variety of terminal blocks thereon.

11. A pedestal cable closure for above ground terminals of buried cable installations, the closure comprising:

a rear member with outwardly projecting siderails; and a flood cover member including an elongated member having a cavity with an opening in its bottom surface for installation over the rear member, and a closed end located at the end of the cavity for preventing the leaking of air, the bottom surface of the elongated member disposed between the opening and bottom periphery of the elongated member having an array of venting apertures, and means for securing the flood cover member to the rear member.

12. The pedestal cable closure of claim 11 in which the flood cover member has a polygonal shape and the bottom of the flood cover member includes grooves for engaging the siderails of the rear member.

13. The pedestal cable closure of claim 12 in which the securing means further comprises:

a pair of latching members on opposite interior sides of the flood cover member, the latching members being located in close proximity to the open end and self-locking when the flood cover member is lowered vertically on the rear member.

* * * * *